(12) United States Patent
Turisin et al.

(10) Patent No.: US 11,927,269 B2
(45) Date of Patent: Mar. 12, 2024

(54) SEAL

(71) Applicant: Black & Decker, Inc., New Britain, CT (US)

(72) Inventors: Marek Turisin, Idstein (DE); Clemens Duenser, Idstein (DE)

(73) Assignee: Black & Decker, Inc., New Britain, CT (US)

( * ) Notice: Subject to any disclaimer, the term of this patent is extended or adjusted under 35 U.S.C. 154(b) by 0 days.

(21) Appl. No.: 17/899,844

(22) Filed: Aug. 31, 2022

(65) Prior Publication Data

US 2023/0066687 A1    Mar. 2, 2023

(30) Foreign Application Priority Data

Sep. 2, 2021 (GB) ...................................... 2112532

(51) Int. Cl.
*F16K 1/22* (2006.01)
*F16K 1/226* (2006.01)

(52) U.S. Cl.
CPC .................................. *F16K 1/2263* (2013.01)

(58) Field of Classification Search
CPC ....... F16K 1/2263; F16K 1/226; F16K 1/2265
See application file for complete search history.

(56) References Cited

U.S. PATENT DOCUMENTS

| | | | |
|---|---|---|---|
| 4,210,313 A | 7/1980 | Chester | |
| 2004/0041117 A1 | 3/2004 | Suzuki | |
| 2005/0022786 A1 | 2/2005 | Arai et al. | |
| 2005/0022787 A1 | 2/2005 | Arai et al. | |
| 2007/0084437 A1 | 4/2007 | Winkelmuller | |
| 2011/0166255 A1 | 7/2011 | Noguchi et al. | |
| 2012/0273708 A1 | 11/2012 | Kim | |
| 2013/0255030 A1 | 10/2013 | Meredith et al. | |
| 2014/0246617 A1 | 9/2014 | Diel | |
| 2017/0299065 A1 | 10/2017 | Miyashita et al. | |
| 2019/0203673 A1 | 7/2019 | Inagaki et al. | |

FOREIGN PATENT DOCUMENTS

| | | |
|---|---|---|
| CN | 212226008 U | 12/2020 |
| CN | 212718042 U | 3/2021 |
| EP | 2644072 | 2/2013 |
| JP | S6030872 B2 | 7/1985 |
| KR | 102219379 B1 | 2/2021 |

OTHER PUBLICATIONS

Extended European Search Report, dated Jan. 23, 2023, in related EP application No. 22192097.8-1015.

*Primary Examiner* — Kelsey E Cary
(74) *Attorney, Agent, or Firm* — Scott B. Markow

(57) ABSTRACT

A seal for a butterfly valve includes an end cap with an outer tubular side wall surrounding an inner tubular side wall, both extending in the same direction providing a gap therebetween. At least the inner side wall is made from a resiliently deformable material. The end cap abuts a conduit entrance, and the inner and outer side walls extend therein, the outer side wall abutting an inner surface of the entrance of the conduit. A rotatable pivotal disk mounted inside the inner side wall within the entrance is rotatable between a position where the periphery of the disk engages the inner side wall to seal the entrance and a position where the disk is angled relative to the entrance, opening the entrance so a fluid may pass through the conduit. A butterfly valve assembly and a vacuum cleaner including the seal or the assembly are also disclosed.

19 Claims, 15 Drawing Sheets

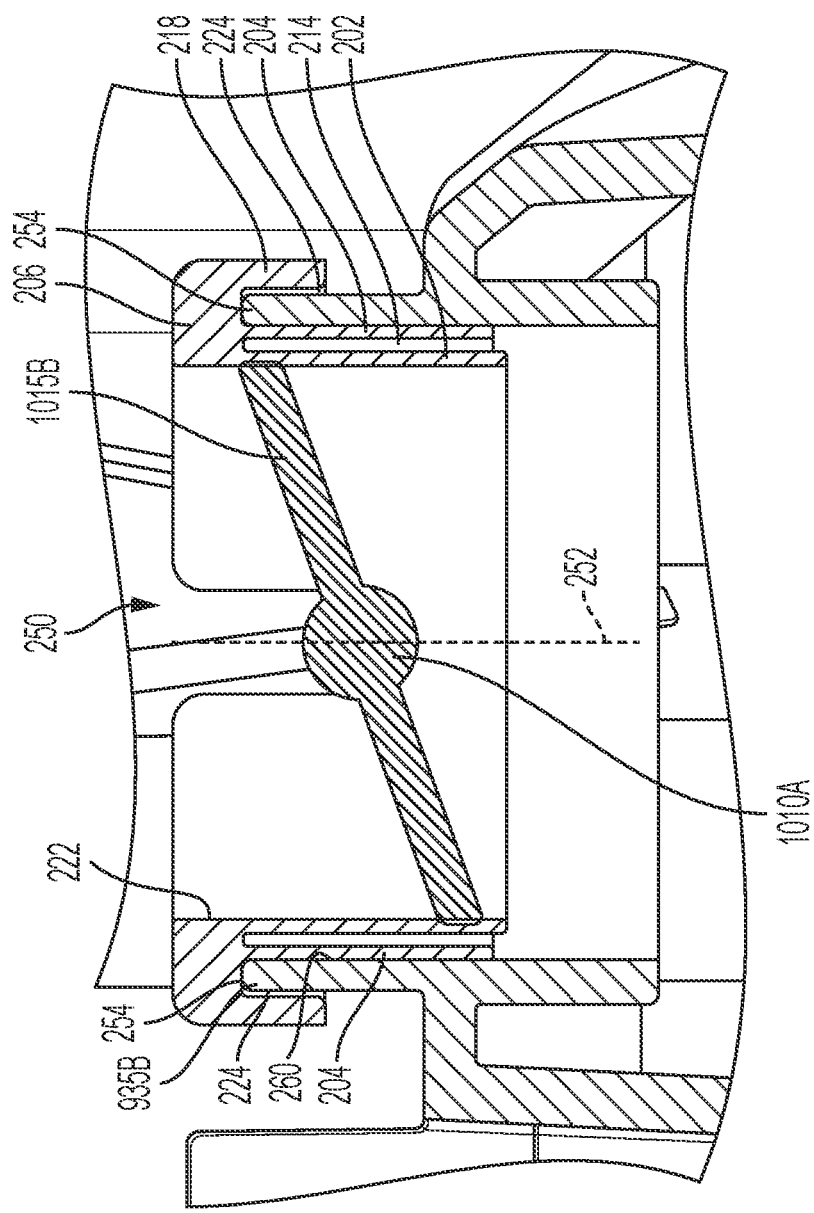

SEAL

CROSS-REFERENCE TO RELATED APPLICATIONS

The present application claims priority under 35 U.S.C. § 119 to GB Application Serial No. 2112532.3 filed on Sep. 2, 2021, which is herein incorporated by reference in its entirety.

FIELD OF THE INVENTION

The present invention relates to a seal for a butterfly valve assembly for a vacuum cleaner, a butterfly valve assembly which comprises a such a seal, and a vacuum cleaner which comprises such a butterfly valve assembly with such a seal.

EP2644072 describes a known example (prior art) of a vacuum cleaner.

BACKGROUND OF THE INVENTION

Referring to EP2644072, the vacuum cleaner comprises two valve assemblies formed as butterfly valves 1005A, 1005B (using the same reference number as those used in EP2644072) which each comprise two circular flat disks 1015A, 1015B rigidly mounted on a rotatable shaft 1010A, 1010B. Rotation of the shafts 1010A, 101B about their longitudinal axes results in rotation of the disks 1015A, 1015B. The disks 1015A, 1015B are mounted on the shafts 1010A, 1010B in such a manner that the plane of the disks 1015A, 1015B pass through the longitudinal axis of the shaft 1010A, 1010B on which it is mounted, the plane extending radially away from the longitudinal axis of the shaft 1010A, 1010B on which it is mounted in a perpendicular direction. The two disks 1015A, 1015B of each butterfly valve 1005A, 1005B are mounted on the shaft 1010A, 1010B next to each along the shaft 1010A, 1010B in such a manner that the plane the two disk 1015A, 1015B extends at different angles perpendicularly from the longitudinal axis of the shaft 1010A, 101B relative to each other.

SUMMARY OF THE INVENTION

Each disk in each pair of disks 1015A, 1015B of each valve 1005A, 1005B are mounted adjacent an entrance of a conduit 935A, 935B, 940A, 940B of a pair of corresponding conduits 935A, 935B, 940A, 940B. The shaft 1010A, 1010B of each valve can be rotated to move the two disks 1015A, 1015B on the shaft 1010A, 1010B between two positions, a first position where it covers the entrance of the adjacent conduit 935A, 935B, 940A, 940B and a second position where the disk 1015A, 1015B is orientated at an angle relative to the entrance of the adjacent conduit 935A, 935B, 940A, 940B, opening the entrance of the conduit 935A, 935B, 940A, 940B to allow a fluid such as air to pass through the conduit 935A, 935B, 940A, 940B. The two disks 1015A, 1015B on each shaft 1010A, 1010B of each valve are angularly mounted of the shaft 1010A, 1010B relative to each other so that when one disk 1015A, 1015B is in its first position to cover the entrance of its adjacent conduit 935A, 935B, 940A, 940B, the other second disk 1015A, 1015B is in its second position where the second disk 1015A, 1015B is orientated at an angle relative to the entrance of its adjacent conduit 935A, 935B, 940A, 940B, and vice versa.

When each disk 1015A, 1015B is in its first position where it covers the entrance of the adjacent conduit 935A, 935B, 940A, 940B (as best seen in FIG. 10D of EP2644072), the outer periphery of the disk 1015A, 1015B abuts against the inner wall of the entrance of the adjacent conduit 935A, 935B, 940A, 940B. The problem with this design is that it provides a poor seal with air still able to pass around the disk 1015A, 1015B, allowing air to continue to pass through the conduit 935A, 935B, 940A, 940B even the entrance of the conduit 935A, 935B, 940A, 940B is covered.

Another problem with the valve design disclosed in EP2644072 is that the entrance of each conduit 935A, 935B, 940A, 940B is angled (non-perpendicular) relative to the longitudinal axis of the conduit 935A, 935B, 940A, 940B (as best seen in FIG. 10D) resulting in on side (the right side in FIG. 10D) being longer than the other side (the left side in FIG. 10D). This results in the disk 1015A, 1015B being angled (non-perpendicular) relative to the longitudinal axis of the conduit 935A, 935B, 940A, 940B when it is in its first position. This results in the problem in that the disk 1015A, 1015B can only rotate in single angular direction (anti-clockwise in FIG. 10D) to move between its first position and its second position. In certain situations, it may be desirable to be able to rotate the disk 1015A, 1015B in either angular direction to move it between its first and second positions.

BRIEF DESCRIPTION OF THE DRAWINGS

An example of a prior art design of valve for a vacuum cleaner and an embodiment of the present invention will now be described with reference to the following drawings of which:

FIG. 5 illustrates a cross sectional view of a conduit with a seal and a valve of the valve assembly of FIG. 3.

DETAILED DESCRIPTION OF THE INVENTION

A prior art design of a valve arrangement in a vacuum cleaner will now be described with reference to FIGS. 1A to 1C and FIGS. 2A to 2D. The description and FIGS. 1A to 1C and FIGS. 2A to 2D correspond to the description and FIGS. 9A to 9C and FIGS. 10A to 10D of EP2644072. The prior art design of valve arrangement in the vacuum cleaner described below with reference to FIGS. 1A to 1C and FIGS. 2A to 2D should be understood with reference to the description of EP2644072.

Figure 1A:
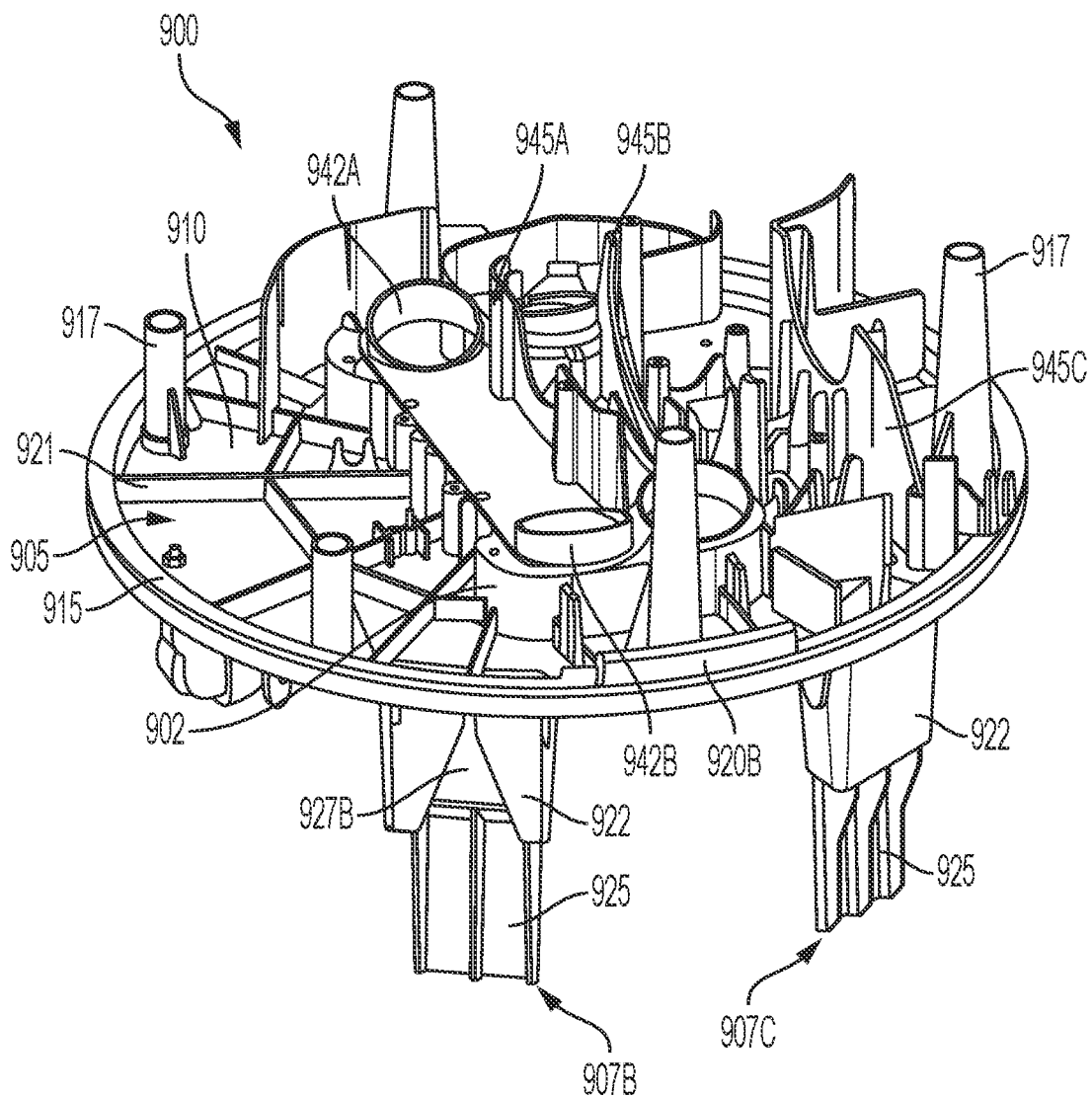
FIG. 1A illustrates an isolated view of a separator plate of prior art design of vacuum cleaner.
Figure 1B:
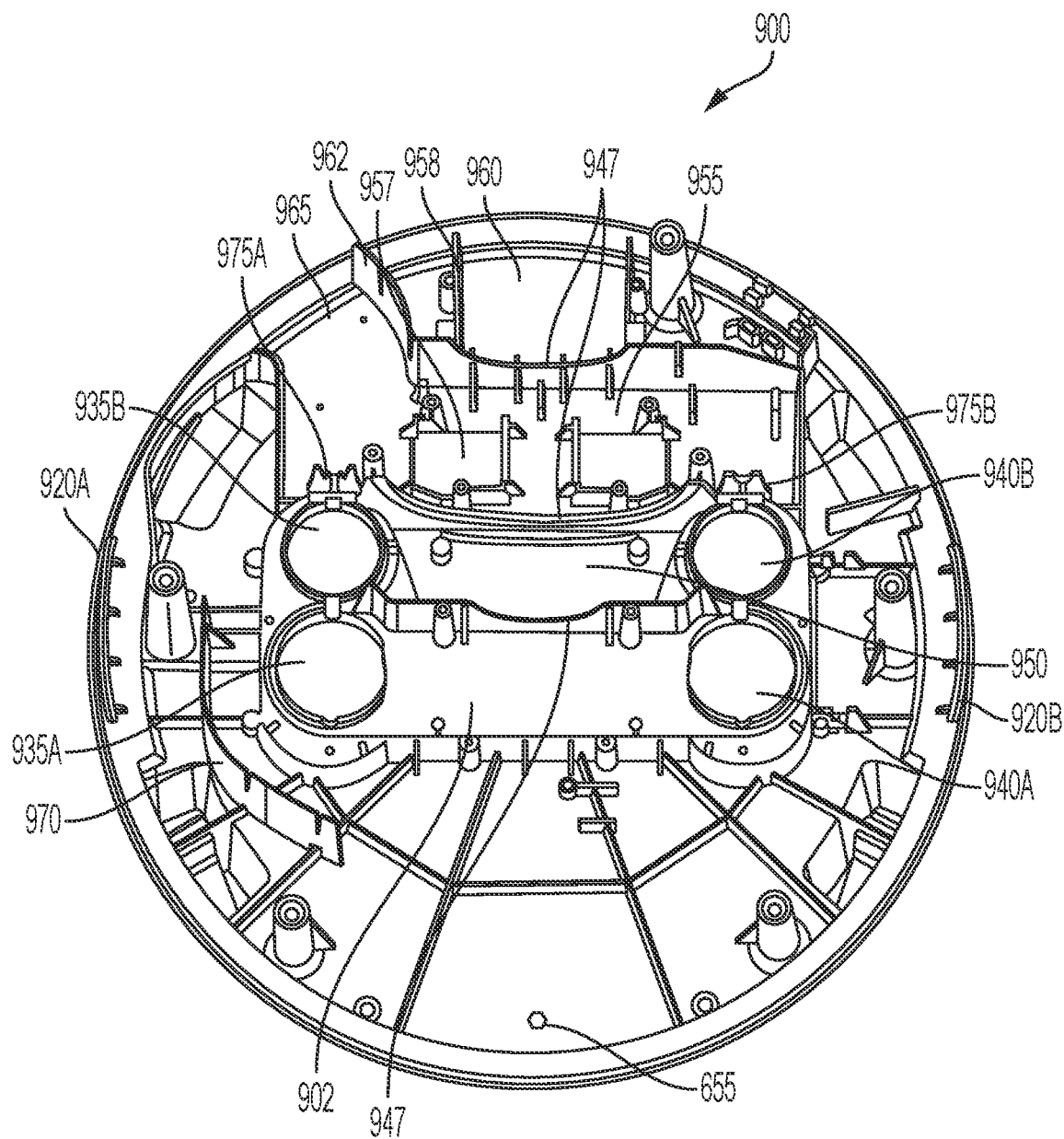
FIG. 1B illustrates a top perspective view of the separator plate shown in FIG. 1A.
Figure 1C:
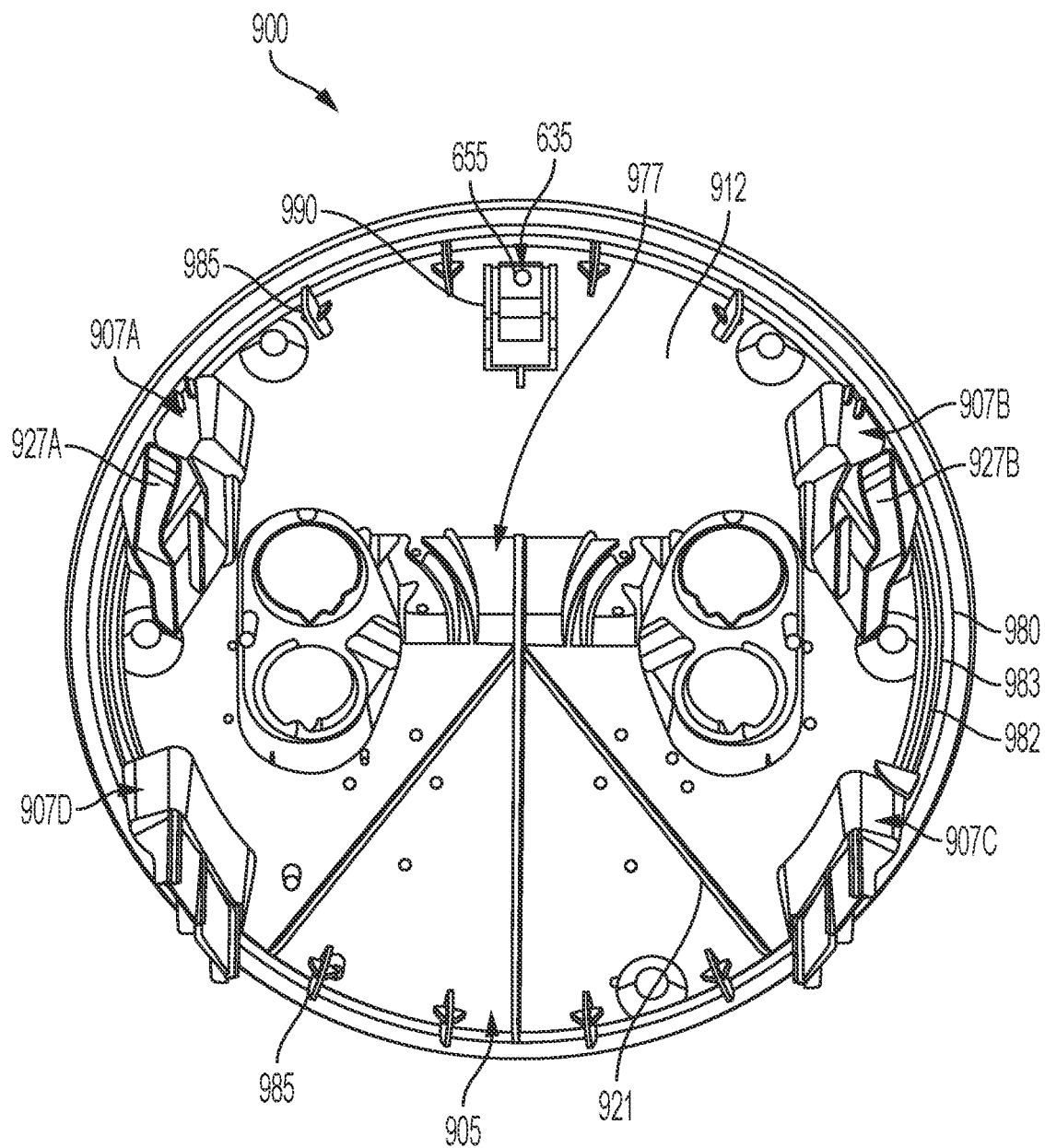
FIG. 1C illustrates a bottom perspective view of the separator plate shown in FIG. 1A.

Referring to FIGS. 1A-1C, a separator plate 900 engages a tank rim (not shown) of a vacuum cleaner, separating a tank cavity (the collection chamber—not shown) from a cavity (not shown) of a vacuum head (not shown) (also called a motor chamber). The separator plate 900 includes a platform 905 (e.g., a generally circulate plate) and one or more leg members 907B, 907C. The platform 905 includes an upper (head facing) surface 910 and a lower (tank facing) surface 912. The shaped and dimensions of the platform 905 may be any suitable for its described purpose. By way of example, the platform 905 may be substantially planar and possess a generally circular shape. A perimetral wall 915, protruding upward from the platform upper surface 910, extends about the circumference of the platform 905. As noted above, the upper surface 910 of the platform 905 may further include one or more connection posts 917 that engage (e.g., mate, receive, etc.) corresponding connection posts (not shown) extending from the vacuum head. Fasteners may extend through the connection posts 917 to secure a lid (not shown) to the separator plate 900. A pair of diametrically opposed lips 920B extends axially (upward) from the perimetral wall 915 to provide an engagement member for latch devices (not shown). The platform 905 may further include one or more reinforcing ribs 921 spanning the platform upper surface 910 to enhance the strength of the platform.

The leg members 907, 907C, extending distally from the platform lower surface 912, are configured to elevate the platform 905 and, in particular, to suspend a filter system above a supporting surface when the separator is placed directly upon the supporting surface. That is the length of the legs is selected to prevent the filters from contacting the ground when the separator plate 900 and/or head is removed from the tank and set on a surface. The leg members 907C, 907B are located proximate the outer edge of the separator plate, being disposed at predetermined angular positions thereon.

The leg members 907C, 907B, moreover, are configured to key the separator plate 900 to a tank (not shown) such that the separator plate is oriented in a specific rotational position when inserted into the tank. As shown in the figures, the platform 905 includes a first forward leg, a second forward leg 907B, a first rearward leg 907C, and a second rearward leg. Each leg 907B, 907C includes a proximal leg portion 922 and a distal leg portion 925. The proximal leg portion 922 of the forward legs 907B includes a notch 927B (e.g., a tapered (V-shaped) notch) configured to receive a guide element (not shown) protruding from an interior surface of the tank. The guide element is positioned at predetermined positions along the tank. The notch 927B aligns with each of the tank guide elements such that the first guide element is received within the notch of the first forward leg and the second guide element is received within the notch of the second forward leg 907B. Consequently, in order for the separator plate 900 to be inserted into the tank cavity, the notch of first leg member must be aligned with the first guide element and the notch 927B of the second leg member 907B must be aligned with the second guide element. Should the forward (notched) leg members 907B not be aligned with their corresponding guide elements (i.e., should the rotational position of the separator plate 900 differ from the normal/predetermined position such that no leg or an unnotched leg is aligned with the guide elements), insertion of the separator plate 900 into the tank cavity of a vacuum cleaner will be prohibited.

The separator plate 900 further includes a conduit system to enable the flow of air between the tank (the collection chamber) and the head (the motor chamber) of a vacuum cleaner. In the example shown, the platform 905 of the separator plate 900 includes a central, raised platform or deck 902 with a first conduit pair 935 and a second conduit pair 940. The first conduit pair 935 includes a first (forward) suction conduit or port 935A and a first (rearward) cleaning conduit or port 935B. Similarly, the second conduit pair 940 includes a second (forward) suction conduit or port 940A and a second (rearward) cleaning conduit or port 940B. The conduits 935A, 935B of the first conduit pair 935 are positioned such that the conduits are disposed over a first filter of the filter system of a vacuum cleaner, while the conduits 940A, 940B of the second conduit pair 940 are positioned such that they are disposed over a second filter of the filter system of the vacuum cleaner (i.e., each filter is in fluid communication with a conduit pair).

The conduits 935A, 935B, 940A, 940B may possess any shape and dimensions suitable for their described purpose. By way of example, each conduit 935A, 935B, 940A, 940B may be generally cylindrical. Each conduit, moreover, may include a conduit baffle operable to direct the airflow in a predetermined direction. As seen best in FIG. 9A, the suction conduit 935A, 940A may include an inboard conduit baffle 942A that curves radially inward with respect to the platform 905 to direct the air inboard, while the cleaning conduits 935B, 940B may include an outboard conduit baffle 942B that curves radially outward to direct air outboard (toward the perimeter of the platform).

The upper surface 910 of the platform 905 further includes first 945A, second 945B, and third 945C support walls that cooperate to support the airflow assembly. As shown, the first support wall 945A extends upward from the upper surface 910 of the platform 905, being oriented between the suction 935A, 940A and the cleaning 935B, 940B conduits. The second support wall 945B is disposed proximate the cleaning conduits 940A, 940B (i.e., is disposed outboard with respect to the first support wall). The third support wall 945C, moreover, is positioned outboard from the second support wall 945B. Each support walls 945A-945C is spaced from its adjacent support wall to define a cavity therebetween. Specifically, the first 945A and second 945B support walls define a fan cavity 950 that receives the fan of an airflow assembly. Similarly, the second 945B and third 945C support walls cooperate to define a motor cavity 955 that receives the motor of the airflow assembly. Each support wall 945A, 945B, 945C includes a cut-out section 947 that receives and supports various components of the airflow assembly. By way of example, the second and third support walls cooperate to support a motor of the airflow assembly, with the motor resting within the cut-out section. The motor cavity 955 further includes areas 957 for supporting valve solenoid switches (discussed in greater detail below).

The separator plate 900 further includes a pair of opposed motor intake walls 958 extending from the third support wall 945C to the perimetral wall 915. The motor intake walls 958 cooperate with a motor shroud to define a motor air intake area 960 that aligns with second head vent. Similarly, opposed walls 962 cooperate with the motor shroud to define a motor exhaust area 965 that aligns with a third head vent.

A deflection wall or baffle 970 extends upward from platform upper surface 910 (e.g., the height of the wall may be substantially equal to or greater than the height of the deck 902). The platform baffle 970 is positioned between the deck 902 and the perimetral wall 915. The platform baffle 970 gradually curves such that it extends from a position along a lateral side of the deck 902 to a position along the forward side of the deck. The platform baffle 970 is operable to direct cooling air exhausted by a manifold toward electronics housed within the head, thereby cooling the electronics.

The platform 905 further includes a first yoke 975A located proximate the first cleaning conduit 935B and a second yoke 975B located proximate the second cleaning conduit 940B. Each yoke 975A, 975B supports an associated butterfly valve 1005A, 1005B (FIG. 2A) of the valve assembly to enable rotation of the valve on the yoke (discussed in greater detail below).

The platform lower surface 912 is best seen in FIG. 1C. As shown, platform lower surface 912 includes a recessed area 977 generally corresponding with the raised deck 902 of the platform upper surface 910. The perimetral wall 915 of the platform upper surface 910, moreover, defines a shoulder 980 on the platform lower surface 912. An axial wall 982 extends downward from the lower surface shoulder 980, being disposed slightly inboard from the circumference of the separator plate 900. The axial wall 982 is wrapped with a generally U-shaped sealing member or gasket 983 configured to contact the rim of the tank of a vacuum cleaner and thereby fluidly seal the joint between the tank rim and the shoulder 980.

A series of downward-extending, angled fins 985 may be angularly spaced about the platform 905, being located near the outer edge of the platform, proximate the shoulder 980. The fins 985 serve as guides during the insertion of the separator plate 900 into the tank cavity. A bracket 990 is also disposed on the platform lower surface 912 that receives a conductive member 635 of the electrostatic discharge device. As shown, the conductive member 635 is coupled to the platform 905 via the conductive fastener 655.

Figure 2A:
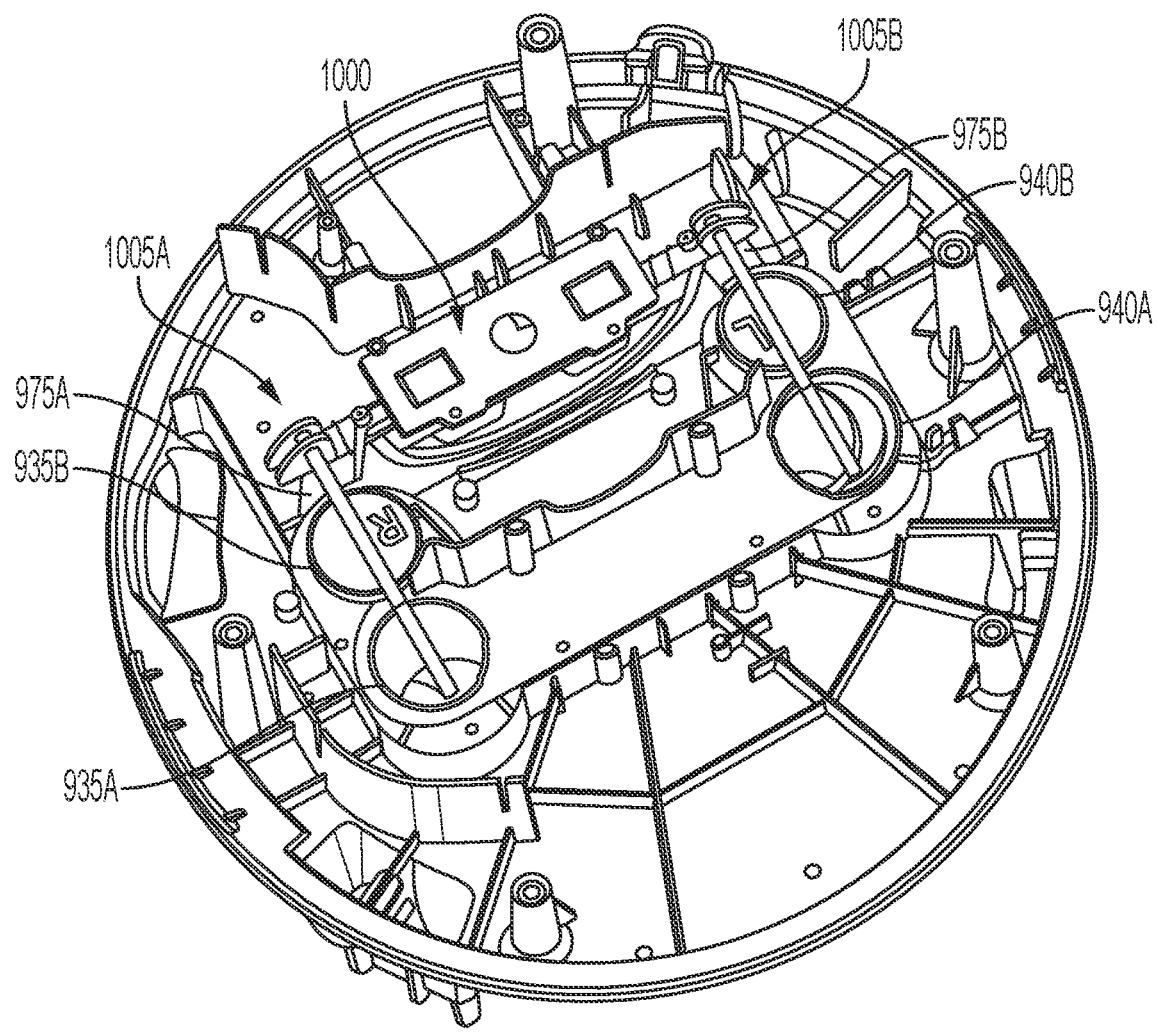
FIG. 2A illustrates a top perspective view of a valve assembly mounted on the separator plate of FIG. 1A.
Figure 2B:
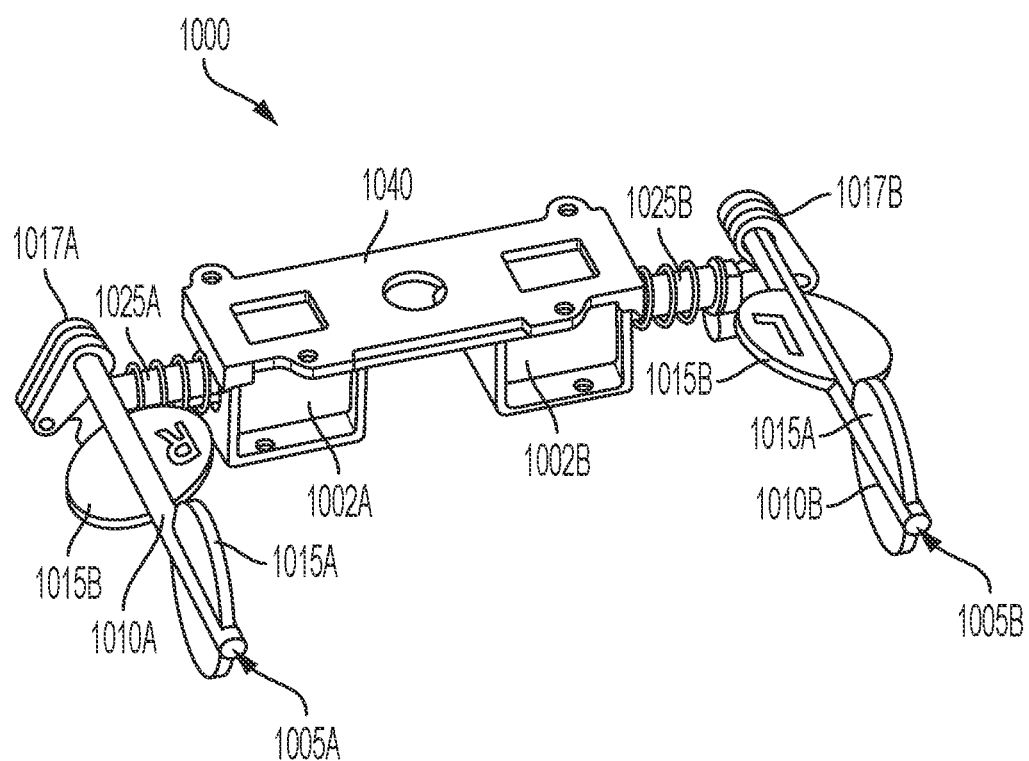
FIG. 2B illustrates an isolated, front perspective view of the valve assembly shown in FIG. 2A.
Figure 2C:
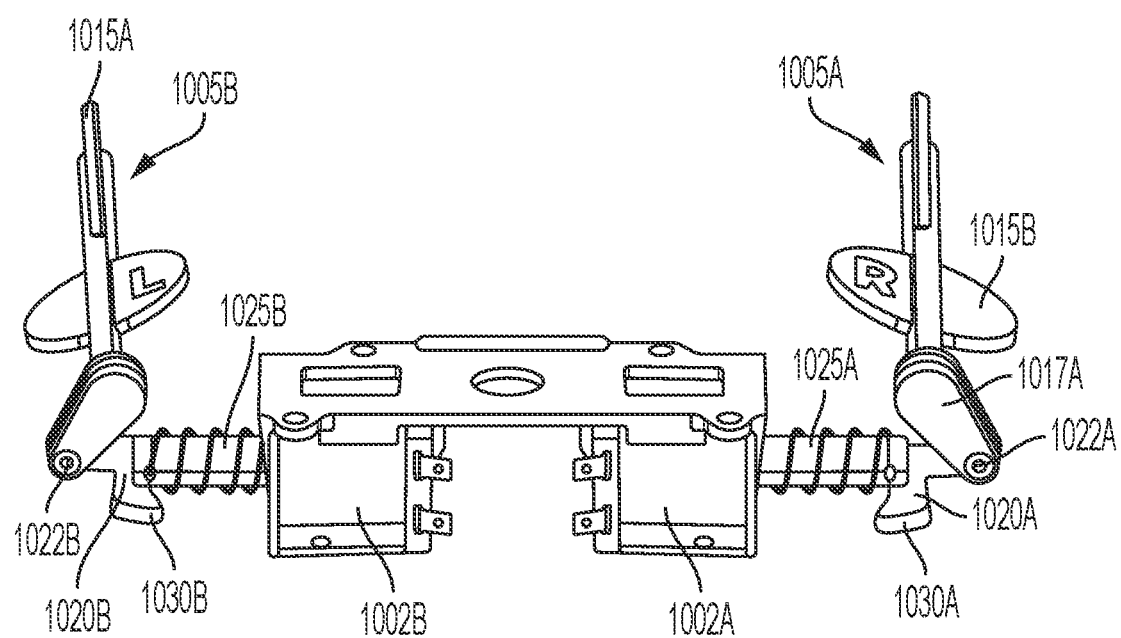
FIG. 2C illustrates an isolated, rear perspective view of the valve assembly shown in FIG. 2A.

A valve assembly, disposed on platform upper surface 910, opens and closes one or more of the separator conduits 935A, 935B, 940A, 940B to selectively permit fluid (air) therethrough. In the example illustrated in FIGS. 2A-2C, the valve assembly 1000 includes a first solenoid 1002A in communication with to a first butterfly valve 1005A and a second solenoid 1002B in communication with to a second butterfly valve 1005B. The first butterfly valve 1005A is supported by the first platform yoke 975A, while the second butterfly valve is supported by the second platform yoke 975B. As seen in FIG. 2A, the valve assembly 1000 is positioned on the separator plate 900, with each solenoid 1002A, 1002B being positioned within areas 957 as described above. The solenoids 1002A, 1002B may be secured to the platform 905 by a cover or bridge 1040 coupled thereto.

The first butterfly valve 1005A selectively permits airflow through the first conduit pair 935A, 935B. Similarly, the second butterfly valve 1005B selectively permits airflow through the second conduit pair 940A, 940B. Each butterfly valve 1005A, 1005B includes an elongated shaft 1010A, 1010B supporting a first or distal disc 1015A and a second or proximal disc 1015B longitudinally spaced along the shaft and rotationally offset from the distal disc by, e.g., approximately 45°.

The proximal end of the shaft 1010A, 1010B is connected to a crank arm 1017A, 1017B, which, in turn, is pivotally coupled to a linking member 1020A, 1020B via a pivot pin 1022A, 1022B. The linking member 1020A, 1020B is repositioned via a plunger 1025A, 1025B that is driven by the solenoid 1002A, 1002B. Specifically, the plunger 1025A, 1025B reciprocates axially to rotate the discs. The linking member 1020A, 1020B may further include a downward-extending, curved support or ski 1030A, 1030B configured to slide along the platform upper surface 910 as the plunger 1025A, 1025B reciprocates. The ski 1030A, 1030B maintains the positioning of the plunger 1025A, 1025B with respect to the solenoid during the plunger's reciprocal motion, keeping the plunger aligned with the drum of the solenoid 1002A, 1002B and preventing the plunger from becoming jammed in the solenoid drum at full extension. With this configuration, each solenoid 1002A, 1002B may be selectively engaged to rotate the shaft 1010A, 1010B about its longitudinal axis in a clockwise or counterclockwise direction. The degree of rotation includes, but is not limited to, approximately 45°.

As a result, the valve assembly 1000 may selectively position each disc 1015A, 1015B with respect to its associated conduit 935A, 935B, 940A, 940B to enable the passage of fluid (e.g., air) therethrough. In operation, the valve assembly 1000 rotationally positions the discs 1015A, 1015B in a first position, in which the suction conduits 935A, 940A are opened and the cleaning conduits 935B, 940B are closed. That is, the butterfly valve 1005A, 1005B positions the shaft 1010A, 1010B such that the first disc 1015A is oriented generally transverse to the opening defined by the suction conduit 935A, 940A (as illustrated in FIG. 2A), thereby permitting airflow between the tank (the collection chamber) and the head (the motor chamber) of a vacuum cleaner. The second disc 1015B, meanwhile, is positioned such that the disc completely covers the opening of the cleaning conduit 935B, 940B preventing the flow of air between the head 110 to the tank 105. Alternatively, the valves 1005A, 1005B may rotationally position the discs 1015A, 1015B in a second (reversed) position, in which the suction conduits 935A, 940A are closed and the cleaning conduits 935B, 940B are opened.

Figure 2D:
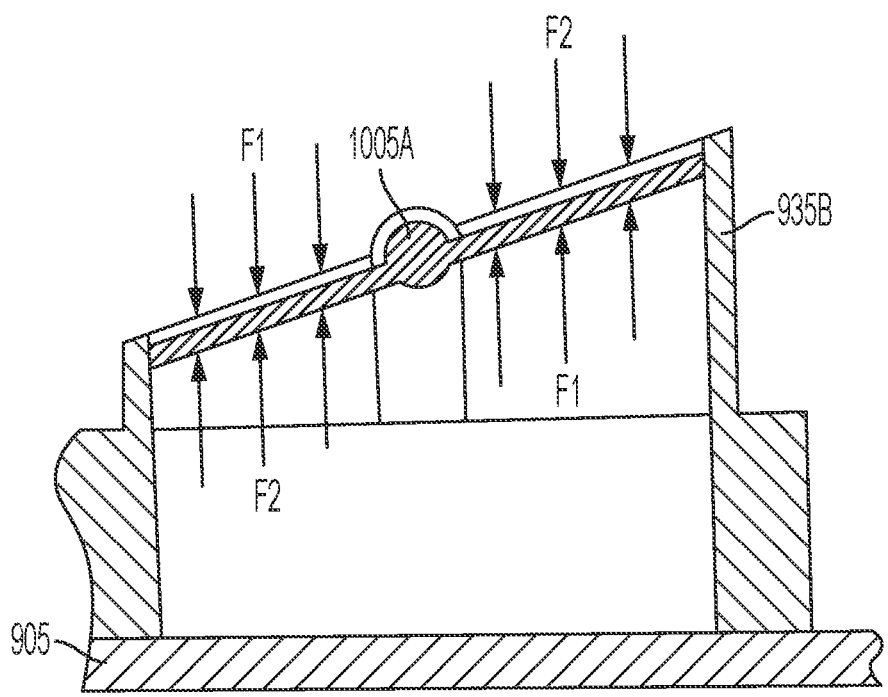
FIG. 2D illustrates a cross sectional view of a conduit and a valve of the valve assembly of FIG. 2A showing the forces acting upon a disc.

As shown in FIG. 2D, the conduits 935A, 935B, 940A, 940B and discs 1015A, 1015B are configured such that air flowing through the conduit creates a balanced system in which the forces on the butterfly valve 1005A, 1005B are equally applied across both surfaces of the disc 1015A, 1015B (indicated by arrows F1 and F2). Specifically, when an air pressure (positive or negative) is experienced on the upper side of the disk, the downward force (F1 upper) on one side of the rotating axis is generally equal to the downward force (F2 upper) on the other side of the axis. Therefore, a pressure on the top side of the disk does not significantly increase the force necessary to toggle the valve. Likewise, when an air pressure is experienced on the lower side of the disk, the upward force (F1 lower) on one side of the rotating axis is generally equal to the upward force (F2 lower) on the other side of the axis. Therefore, a pressure on the lower side of the disk does not significantly increase the force necessary to toggle the valve to its next operating condition. This enables the utilization of a small solenoid to rotate the valve 1005A, 1005B as described above, and provides an advantage over other valve types (e.g., piston valves, etc.) which have larger pressures to overcome and require large forces to toggle between operating positions. That is, the conduit structure enables the use of a lower power solenoid since valve rotation does not require overcoming a significant eccentric force applied to the disc 1015A, 1015B by the air in or airflow through the conduit.

An embodiment of the present invention will now be described with reference to FIGS. 3 to 6. The vacuum cleaner in accordance with the present invention is the same as the example of vacuum cleaner described above with reference to FIGS. 1 and 2 except for the design of the butterfly valves 1005A, 1005B. The butterfly valves 1005A, 1005B have been altered by changing the design of the conduits 935A, 935B, 940A, 940B and the addition of a seal in at least one of the conduits of each butterfly valve 1005A, 1005B. Where the same features which are present in the example of vacuum cleaner described above with reference to FIGS. 1 and 2 are present in the embodiment of the present invention, the same reference numbers have been used.

Figure 3:
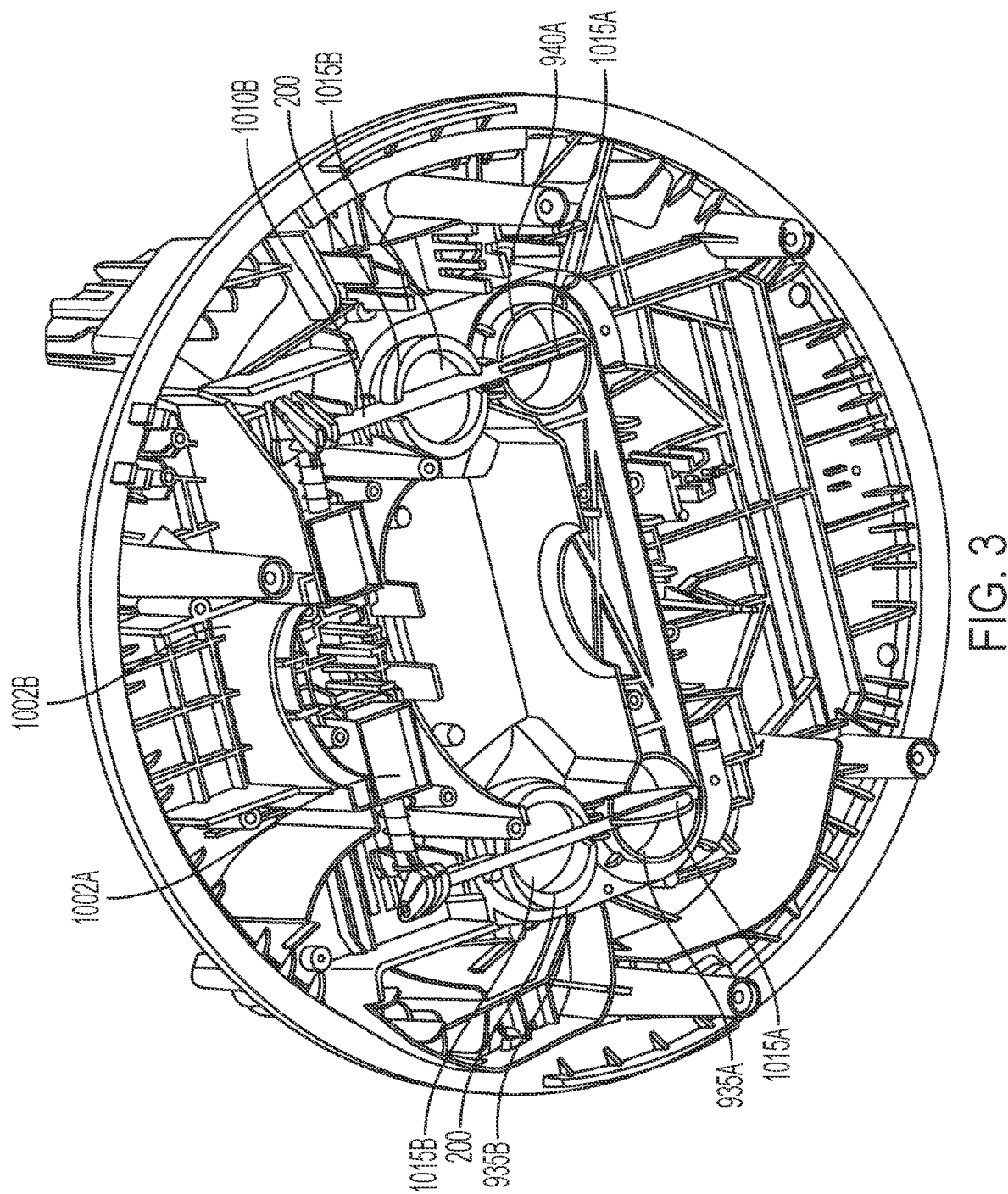
FIG. 3 illustrates a top perspective view of a valve assembly mounted on a separator plate in accordance with the present invention.
Figure 4:
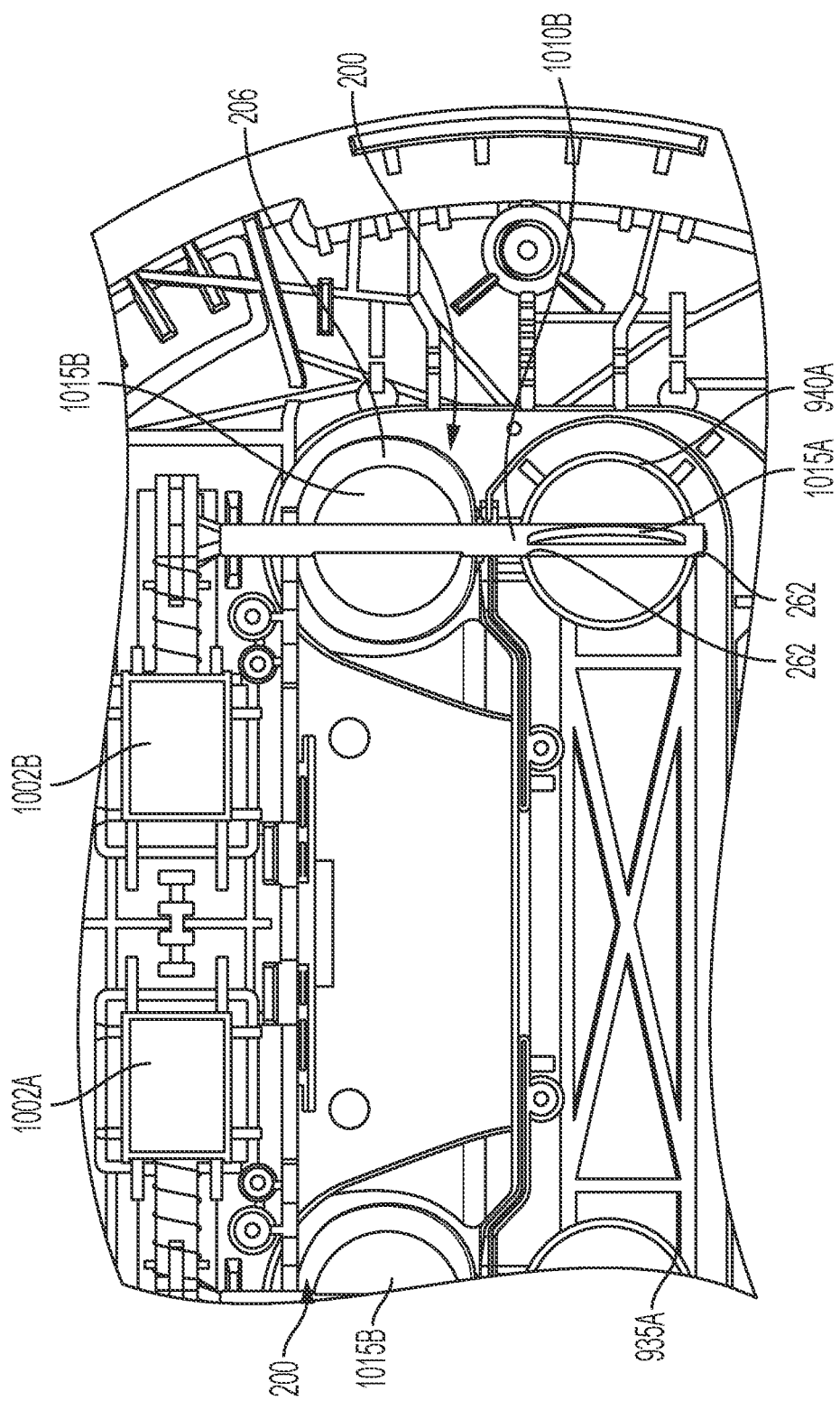
FIG. 4 illustrates a top view of the valve assembly mounted on the separator plate shown FIG. 3.

Referring to the FIGS. 3 and 4, each butterfly valve 1005A, 1005B, comprises two conduits 935A, 935B, 940A, 940B. Located in the entrance 250 of one of the conduit 935B, 940B of each butterfly valve 1005A, 1005B, is a seal 200. As best seen in FIG. 5, the edges 254 of the entrances 250 of the conduits 935B, 940B with the seals 200 are perpendicular relative to the longitudinal axis 252 of the conduit 935B, 940B resulting in the edge 254 of the entrance on all sides being the same height.

FIGS. 6A to 6E shows the seal 200. The seal 200 comprises a cap 206 and two concentric tubular side walls 202, 204 which surround a longitudinal axis 208 of the seal 200 and which are each connected at a first top end to the cap 206.

The first inner tubular side wall 202 has a circular cross section in a direction perpendicular to the longitudinal axis 208, along the length of the first inner tubular side wall 202, the size of the cross section being constant and uniform along the length of the wall 202. The first inner tubular side wall 202 surrounds the longitudinal axis 208 in a symmetrical manner. The thickness 210 of wall 202 is constant around the longitudinal axis 208 of the seal 200 and along the length of the wall 202.

The second outer tubular side wall 204 has a circular cross section in a direction perpendicular to the longitudinal axis 208, along the length of the second outer tubular side wall 204, the size of the cross section being constant and uniform along the length of the wall 204. The second outer tubular side wall 204 surrounds the longitudinal axis 208 in a symmetrical manner. The thickness 212 of wall 204 is constant around the longitudinal axis 208 of the seal 200 and along the length of the wall 204.

The second outer tubular wall 204 surrounds the first inner tubular wall 202 in a concentric and symmetrical manner so that a constant radial gap 214 is formed between the two walls 202, 204 around the longitudinal axis 208 of the seal 200 and along the length of the walls 202, 204. The thickness 212 of the second outer tubular wall 204 is the same as that of the first inner tubular wall 202. The length of the second outer tubular wall 204 is slightly less than that of the first inner tubular wall 202.

The cap 206 comprises an annular base 216 and an outer ring-shaped rim 218 connected to outer periphery of the annular base 216 and which extends perpendicularly to the annular base 216. The two tubular walls 202, 204 attach to the underside of the annular base 216. The first inner wall 202 attaches to the annular base 216 adjacent the inner edge 222 of the annular base 216 in order to form a tubular passage 220 of uniform circular cross section through the whole length of the inner wall 202 and the annular base 216. The second outer tubular wall 204 connects to the underside of annular base 216 between the rim 218 and the inner tubular wall 202. The rim 218 extends in parallel to the two tubular walls 202, 204 and surrounds the top part of the two tubular walls 202 in a concentric and symmetrical manner so that a constant radial gap 224 is formed between the rim 218 and the outer tubular wall 204. The thickness of the rim 218 is slightly larger than that of the two tubular walls 202, 204 but which is less than the thickness of the annular base 216.

Figure 6A:
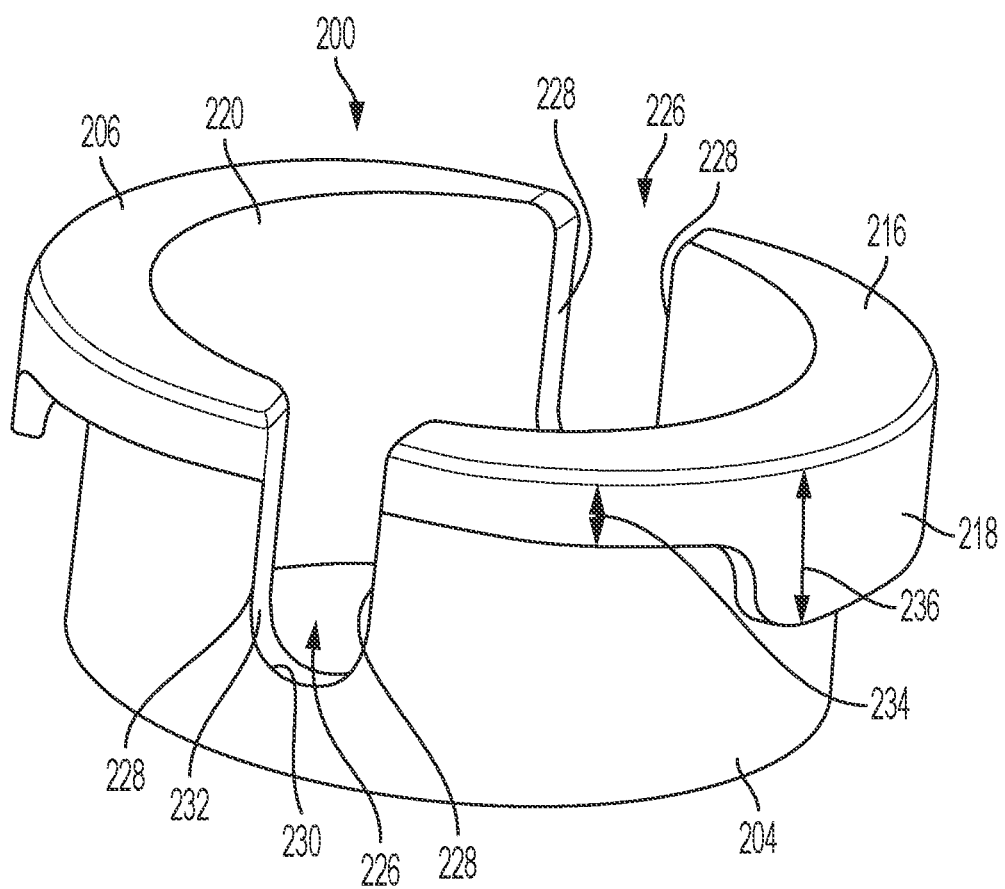
FIG. 6A shows a perspective view of the seal used in the valve assembly shown in FIG. 3.
Figure 6B:
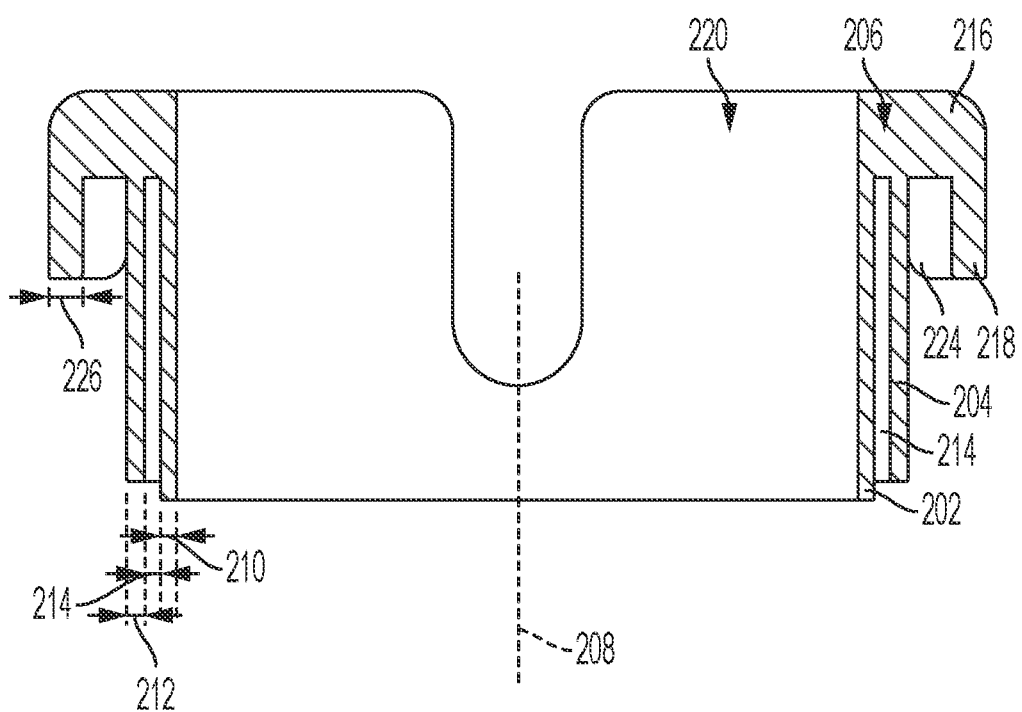
FIG. 6B shows a vertical side cross-sectional view of the seal used in the valve assembly shown in FIG. 3.
Figure 6C:
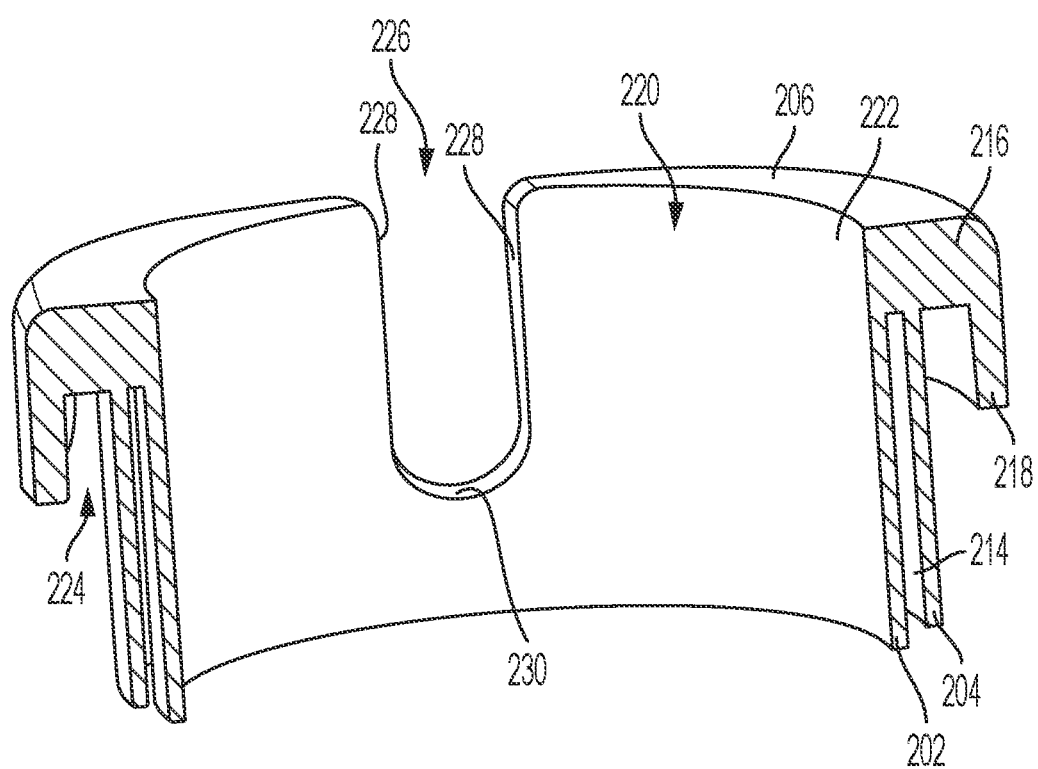
FIG. 6C shows a vertical perspective cross-sectional view of the seal used in the valve assembly shown in FIG. 3.
Figure 6D:
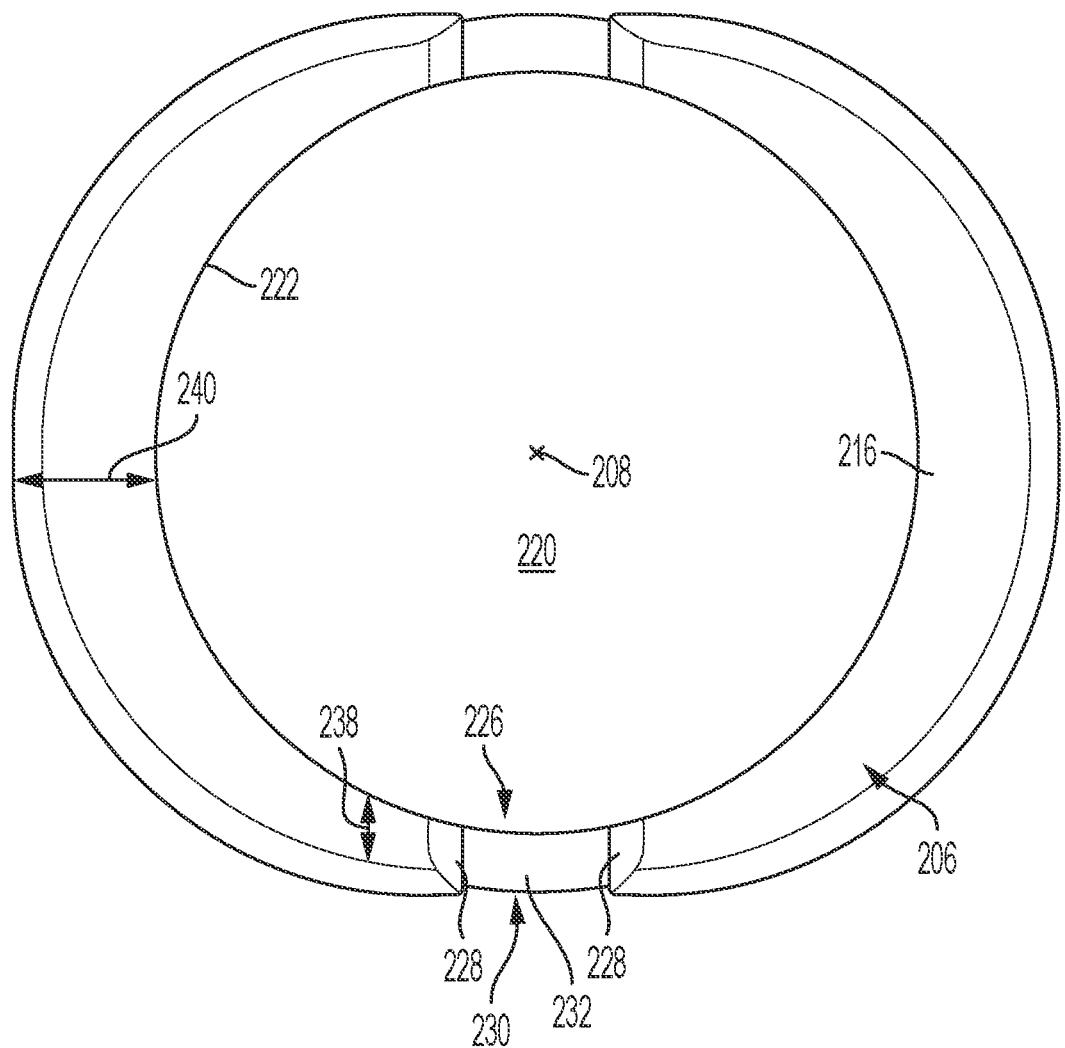
FIG. 6D shows a top view of the seal used in the valve assembly shown in FIG. 3.
Figure 6E:
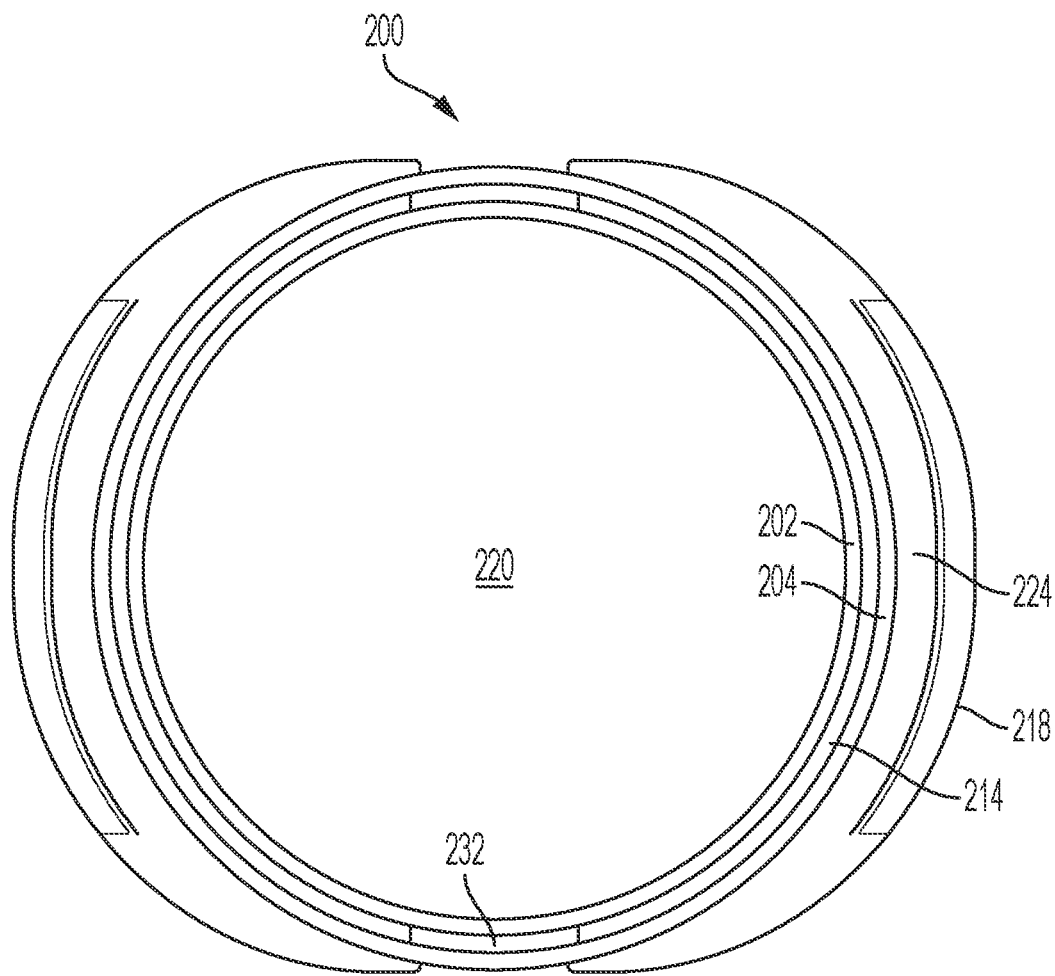
FIG. 6E shows a bottom view of the seal used in the valve assembly shown in FIG. 3.

Two cut outs 226 (as best seen in FIG. 6A) are formed through the rim 218 and the annular base 216 of the cap 206, and the two tubular side walls 202, 204 on opposite sides of the seal 200, in a symmetrical manner. Each cut out 226 comprises two straight sides 228, which extend in a direction parallel to the longitudinal axis 208 of the seal 200, and a semi-circular side 230 which interconnects between the two straight sides 228. A bridging wall 232 connects between the outer tubular side wall 204 and inner tubular side wall 202 along the two straight sides 228 and the semi-circular side 230 to enclose the radial gap 214. The length 234 of the rim 218 on either side of the cut outs 226 is shorter than the length 236 of the rim 218 around the rest of the annular base 216. The width 238 of the annular base 216 on either side of the cut outs 226 is slightly less than the width 240 of the annular base 216 around the rest of the annular base 216.

The seal (200) is made in a one-piece construction from resiliently deformable rubber material. However, it will be appreciated that the seal could be made from a plurality of components. Regardless of whether the seal is made in a one-piece construction or a plurality of components, so long as the inner tubular side wall 202 is made from resiliently deformable material, the seal can function.

When the seal 200 is inserted into the entrance 250 of the conduit 935A, 935B, 940A, 940B, the cap 206 abuts the edge 254 of the entrance 250, the edge 254 of the entrance 250 locating in the radial gap 224 between the rim 218 of the seal 200 and the outer tubular wall 204 as best seen in FIG. 5. When the seal is located in the entrance 250, the longitudinal axis 252 of the conduit 935B, 940B is co-axial with the longitudinal axis 208 of the seal 208. The outer tubular wall 204 locates inside the entrance 250 and abuts against the inner surface 260 of the entrance of the conduit 935B, 940B. The constant radial gap 214 between the two walls 202, 204 remains unaltered when no external force is applied to the inner wall 202 when the seal 200 is located inside the entrance of the conduit 935A, 940B.

The disk 1015B of the butterfly valve is located inside of the inner tubular wall 202 of the seal 200 inside of the entrance 250 on the conduit 935B, 940B as best seen in FIG. 5. Two gaps 262 are formed in the edge 254 of the entrance 250 on opposite sides of the entrance 250 which align with the cut outs 226 of the seal 200 when the seal 200 is inserted into the entrance 250 of the conduit 935B. The shaft 1010A on which the disk 1015B is mounted extends through the two gaps 262 and the cut outs 226. A solenoid 1002A, 1002B moves the disks 1015A, 1015B between two positions, a first position where it seals the entrance 250 the conduit 935B, 940B (as shown in FIG. 5) and a second position where the disk 1015A, 1015B is orientated at an angle relative to the entrance 250, opening the entrance 250 of the conduit 935B 940B to allow air (fluid) to pass through the conduit 935B, 940B. When the disk 1015A, 1015B is in its first position, its periphery engages with and abuts against the inner wall 202 of the seal 200. As the disk 1015A, 1015B is pressed against the inner wall 202 by the solenoid 1002A, 1002B, the inner wall 202 flexes radially outwardly, the movement being accommodated by the reduction the size of the radial gap 214 as the inner wall 202 bends. The resilient nature of the material of the inner wall 202 of the seal 200 results in the inner wall 202 urging against the periphery of the disk 1015A, 1015B. As such, an airtight seal is produced between the periphery of the disk 1015A, 1015B and the inner wall 202 of the seal 200. When the solenoid 1002A, 1002B moves the disks 1105B from its first position to its second position, the periphery of the disk 1015A, 1015B disengages from the inner wall 202 of the seal 200. The inner wall 202 of the seal reverts to its original shape due to the resilient nature of the material form which the seal 200 is made.

What is claimed is:

1. A seal for a butterfly valve assembly comprising:
an end cap;
an inner tubular side wall attached at one end to the end cap; and
an outer tubular side wall attached at the one end to the end cap and which surrounds the inner tubular side wall and extends in a same direction as the inner tubular side wall to provide a first gap between the inner tubular side wall and outer tubular side wall;
wherein at least the inner tubular side wall is made from a resiliently deformable material,
wherein the end cap comprises an annular base and a rim attached to the annular base, and
wherein the inner tubular side wall attaches to the annular base adjacent the inner edge of the annular base to form a tubular passage of uniform circular cross section through the whole length of the inner wall and the annular base.

2. The seal as claimed in claim 1 wherein the inner tubular side wall is circular in cross-section, in a direction perpendicular to a longitudinal axis of the seal, along the length of the inner tubular side wall.

3. The seal as claimed in claim 1, wherein the outer tubular side wall is circular in cross-section, in a direction perpendicular to a longitudinal axis of the seal, along the length of the outer tubular side wall.

4. The seal as claimed in claim 1, wherein a thickness of one or more of the inner tubular side wall and the outer tubular side wall is constant.

5. The seal as claimed in claim 1, wherein inner the tubular side wall and the outer tubular side wall are concentric around a longitudinal axis and the first gap has a constant thickness.

6. The seal as claimed in claim 1, wherein the inner tubular side wall is attached to the annular base and the outer tubular side wall is attached to the annular base.

7. The seal as claimed in claim 1, wherein the rim surrounds the outer tubular side wall to provide a second gap between the rim and the outer tubular side wall.

8. The seal as claimed in claim 1, wherein the rim is attached to an outer periphery of the annular base.

9. The seal as claimed in claim 1, wherein the rim and the outer tubular side wall are concentric around a longitudinal axis to form a second gap of constant thickness.

10. The seal as claimed in claim 1, wherein at least one cut out is formed through the end cap, the inner tubular side wall and the outer tubular side wall.

11. The seal as claimed in claim 1, wherein at least one cut out is formed through at least the annular base, the inner tubular side wall, the outer tubular side wall and the rim.

12. A butterfly valve assembly comprising:
at least one conduit having an entrance through which a fluid can pass;
a seal comprising:
an end cap;
an inner tubular side wall attached at one end to the end cap; and
an outer tubular side wall attached at the one end to the end cap and which surrounds the inner tubular side wall and extends in a same direction as the inner tubular side wall to provide a first gap between the inner tubular side wall and outer tubular side wall;
wherein at least the inner tubular side wall is made from a resiliently deformable material;
wherein the seal is mounted in the entrance of the conduit so that the end cap abuts against an edge of the entrance and the inner tubular side wall and outer tubular side wall extend into the entrance the outer tubular wall abutting against an inner surface of the entrance of the conduit;
wherein the edge comprises a second gap and the seal includes a cut-out aligned with the second gap when the seal is mounted in the entrance of the conduit; and
a rotatable pivotal disk mounted inside the inner tubular side wall of the seal within the entrance which can be rotated between a first position where the periphery of the disk engages the inner tubular side wall of the seal to seal the entrance of the conduit and a second position where the disk is orientated at an angle relative to the entrance of the conduit, to disengage the periphery of the disk from the inner wall in order to open the entrance and allow the fluid to pass through the conduit.

13. The butterfly valve assembly as claimed in claim 12, wherein the conduit comprises a longitudinal axis; and wherein the edge of the entrance of the conduit is perpendicular relative to the longitudinal axis of the conduit.

14. The butterfly valve assembly as claimed in claim 12, wherein the edge of the entrance locates in a third gap between the rim and an outer tubular side wall of the seal.

15. The butterfly valve assembly as claimed in claim 12, wherein the disk is mounted on a rotatable shaft, wherein the shaft extends from the entrance through the cut out and the second gap.

16. A vacuum cleaner comprising:
a butterfly valve assembly comprising:
at least one conduit having an entrance through which a fluid can pass;
a seal comprising:
an end cap;
an inner tubular side wall attached at one end to the end cap; and
an outer tubular side wall attached at the one end to the end cap and which surrounds the inner tubular side wall and extends in a same direction as the inner tubular side wall to provide a first gap between the inner tubular side wall and outer tubular side wall;
wherein at least the inner tubular side wall is made from a resiliently deformable material;
wherein the seal is mounted in the entrance of the conduit so that the end cap abuts against an edge of the entrance and the inner tubular side wall and outer tubular side wall extend into the entrance with the outer tubular wall abutting against an inner surface of the conduit with no portion of the conduit received in the first gap; and
a rotatable pivotal disk mounted inside the inner tubular side wall of the seal within the entrance which can be rotated between a first position where the periphery of the disk engages the inner tubular side wall of the seal to seal the entrance of the conduit and a second position where the disk is orientated at an angle relative to the entrance of the conduit, to disengage the periphery of the disk from the inner wall in order to open the entrance and allow the fluid to pass through the conduit.

17. The vacuum cleaner of claim 16, wherein the inner tubular wall does not abut the inner surface of the conduit.

18. The vacuum cleaner of claim 16, wherein the conduit comprises a recess and the seal includes a cut-out aligned with the recess when the seal is mounted in the entrance of the conduit.

19. The vacuum cleaner of claim 16, wherein the edge comprises a second gap and the seal includes a cut-out aligned with the second gap when the seal is mounted in the entrance of the conduit.

* * * * *